Dec. 16, 1952                      R. L. ATKINSON                      2,621,934
                    AGRICULTURAL DISTRIBUTOR FOR SPREADING
                       MANURES, FERTILIZERS OR THE
                            LIKE OVER THE GROUND
Filed June 11, 1948                                             2 SHEETS—SHEET 1

INVENTOR
Richard L. Atkinson
BY
Howard P. King
ATTORNEY

Dec. 16, 1952  R. L. ATKINSON  2,621,934
AGRICULTURAL DISTRIBUTOR FOR SPREADING
MANURES, FERTILIZERS OR THE
LIKE OVER THE GROUND
Filed June 11, 1948  2 SHEETS—SHEET 2
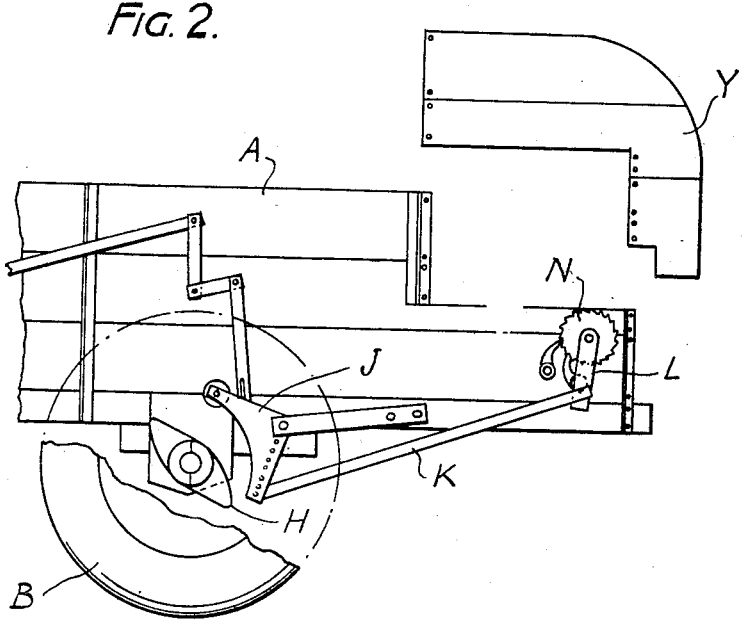
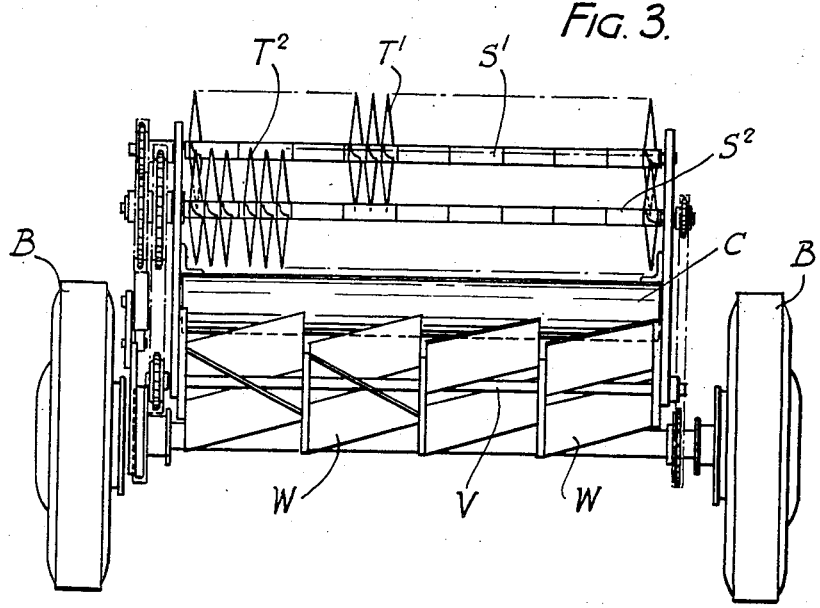
INVENTOR
Richard L. Atkinson
BY
Howard P. King
ATTORNEY Patented Dec. 16, 1952

2,621,934

UNITED STATES PATENT OFFICE 2,621,934

AGRICULTURAL DISTRIBUTOR FOR SPREADING MANURES, FERTILIZERS, OR THE LIKE OVER THE GROUND

Richard Leslie Atkinson, Padiham, England

Application June 11, 1948, Serial No. 32,316
In Great Britain October 24, 1945

1 Claim. (Cl. 275—6)

The present invention relates to agricultural distributors for spreading manures, fertilizers or other materials over the land of the type comprising a movable base adapted to be moved intermittently towards one end of the vehicle carrying said materials, a plurality of tynes rotatably mounted upon two or more shafts extending across the vehicle at that end toward which said base moves, and a plurality of impellers so constructed and arranged as to receive the material delivered by said tynes and broadcast the same in an even manner over the ground and beyond the wheel tracks of said vehicle.

According to the present invention an agricultural distributor of the type described is provided with a detachable frame carrying the distributing tynes and impellers and the driving mechanism therefor so that the distributing mechanism can be removed and replaced by a plain tail unit so that the vehicle can be used as an ordinary trailer.

In the accompanying drawing illustrating one form of distributor constructed in accordance with the present invention:

Figure 2 is a side elevation of the rear end of said trailer vehicle showing removable side pieces which can be fitted in place of the distributor mechanism to enable the vehicle to be used as an ordinary trailer vehicle for carrying material; and Figure 3 is a rear view of the trailer vehicle with the distributing mechanism in place.

Figure 1:
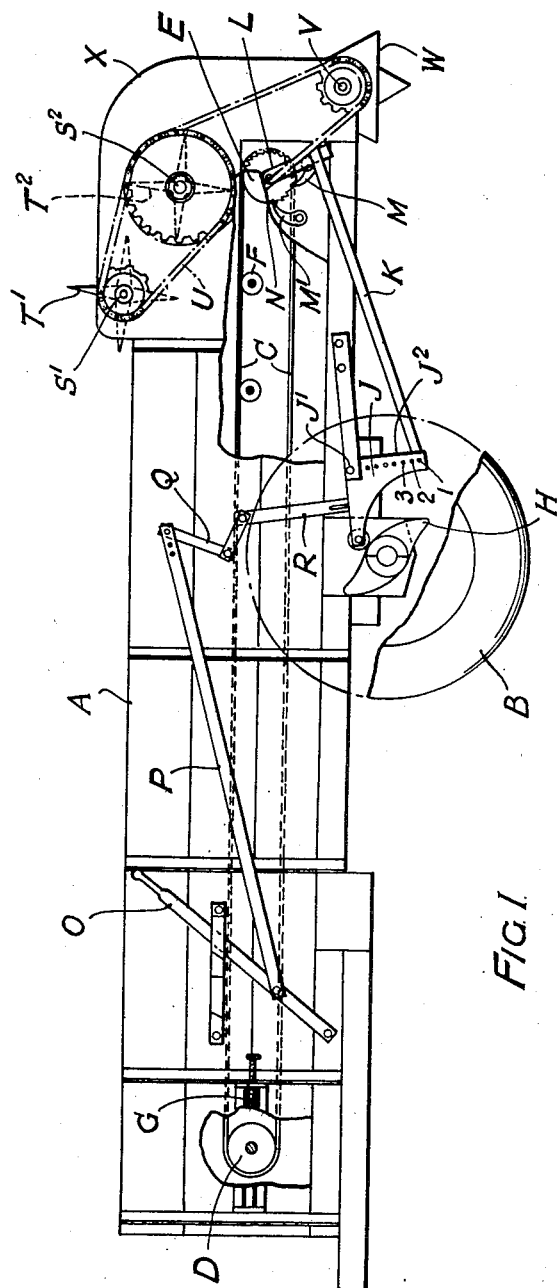
Figure 1 is a side elevation of a two-wheeled trailer vehicle embodying said distributor, parts of the vehicle being shown broken away.

In the form of distributor shown on the drawings a trailer vehicle body A mounted on a single axle with two wheels B is provided with a movable base comprising an endless rubber or other flexible belt C which serves as the floor of the trailer vehicle. The said endless belt C runs over rollers D and E mounted respectively at the front and rear end of the vehicle and over intermediate idle rollers F. Said rollers D and E may be driven from the axle of the trailer vehicle and are so operated that the upper run of the belt which forms the floor of the trailer is moved towards the rear end of said trailer so as to carry the manure, fertilizer or other material carried by the trailer rearwards into contact with the distributing mechanism. The roller D at the front end of the trailer is longitudinally adjustable by means of a screw G for the purpose of tensioning said endless belt C. The motion imparted to the endless belt is an intermittent one which may be effected by ratchet-and-pawl mechanism actuated from a double cam H on the axle of the trailer. Said cam oscillates a bell-crank lever J pivoted at $J^1$ and connected by an operating rod K to an arm L carrying a pawl M engaging a ratchet wheel N mounted on the shaft of the rear roller E. By this means said roller E is intermittently rotated and the endless belt C consequently moved intermittently so that its upper run travels towards the rear end of the trailer vehicle. Backward rotation of the roller E is prevented by a second pivoted pawl $M^1$. The bell crank J may be lifted from engagement with the operating cam H so as to put the ratchet mechanism out of action by means of a hand lever O operable by the driver of the vehicle and connected to said bell-crank J by a rod P, bell-crank Q, and rod R. The rate of intermittent movement imparted to the endless belt C and consequently the rate of distribution of the material may be adjusted by providing several positions 1, 2, 3, etc., along the arm $J^2$ of the bell-crank J for connecting the front end of the operating rod K thereto, thereby varying the leverage of said bell-crank J in its action upon the ratchet driving mechanism.

The distributing mechanism comprises two rotary cross shafts $S^1$ and $S^2$ each carrying tynes $T^1$ and $T^2$. Both shafts are driven in the same direction for example by chain-and-sprocket gearing U and the tynes $T^1$ are arranged to mesh with the tynes $T^2$ while the latter are arranged so as just to clear the endless belt C as it passes over the rear roller E. To the rear of and below said roller E there is arranged another shaft V carrying a series of rotary impeller blades W which are driven by chain-and-sprocket gearing and receive the material delivered from the belt C by the tynes and distribute it evenly over the ground and to some distance beyond the track of the wheels B of the trailer. The drive to the tyne shafts and to the impeller shaft is from the trailer axle for example by a chain totally enclosed in oil bath cases.

The distributing mechanism is according to the invention mounted upon a detachable frame or like support X adapted for quick attachment to the rear end of the trailer. By replacing this frame or support by a detachable tail unit Y as indicated in Figure 2 the vehicle may be used as an ordinary trailer vehicle for carrying materials. In this form the trailer may be used as a tipping vehicle in which case the endless belt may be operated by suitable hand gear for tipping the load.

The trailer may be fitted with pneumatic tyred wheels and have a carrying capacity for example of two tons. The sides of the vehicle may be constructed in the conventional manner with an attachment at the front end of the normal towing bar. Conveniently the front of the trailer may be slightly inclined inwards with respect to the vertical and foreshortened so as to permit the endless belt to pass beneath.

In order to seal the gap between the sides of the endless belt and the sides of the trailer a triangular guard is mounted along the walls of the trailer slightly above the upper surface of the belt so that there is a lower horizontal base of the triangular guard parallel with the marginal portion of the endless belt. Depending from the inner edge of the triangular guard is a strip of flexible material for example rubber against which the endless belt wipes. Any material which leaks between this strip and the belt passes harmlessly over the edge of the belt and on to the ground.

When finely-divided material is being distributed a canopy may be fitted partially to enclose the tynes and impellers so as to prevent the material from being blown about by the wind. A screen of flexible material for example canvas may provide a further attachment to the canopy which extends almost to the ground. The gap left between the screen and the ground should be sufficient to permit the material being distributed beyond the width of the trailer.

By the use of the invention compositions such as hydrated lime, ground limestone, basic slag, farmyard manure, artificial fertilizers or the like can be evenly distributed over the ground or by removing the distributing mechanism the vehicle can be used as an ordinary trailer or a tipping trailer.

What I claim is:

An agricultural distributor of the type herein described, comprising in combination with a vehicle body having a horizontal seating at the rear thereof for an attachable and detachable frame, a frame having two sides and said sides being attachable to and detachable from said vehicle body, distributing mechanism carried by said frame between said sides thereof, said distributing mechanism comprising distributing tines and impellers and driving mechanism therefor mounted between said frame sides and constituted as a unitary assembly with said frame so that the distributing mechanism and frame can be readily detached as a unit from said vehicle and replaced by a plain tail unit, said frame sides each being of inverted L shape thereby each providing a horizontal limb, said distributing tines being carried by the said horizontal limb of the two sides of the frame, and said horizontal limbs being directly over and seated on said horizontal seating at the rear of the vehicle, whereby bolts detachably securing the frame to the rear part of the vehicle are relieved of the weight of the distributor unit, each said side of the frame providing a vertical limb, said impellers being carried by said vertical lmb of the two sides, and said vertical limbs and impellers extending downwardly at the rear of the vehicle, and said assembly having its center of gravity in the region between said horizontal limbs of the frame so as to be directly over and carried by the said horizontal seating of the vehicle therefor.

RICHARD LESLIE ATKINSON.

REFERENCES CITED

The following references are of record in the file of this patent:

UNITED STATES PATENTS

| Number | Name | Date |
| --- | --- | --- |
| 1,213,554 | Synck | Jan. 23, 1917 |
| 1,648,653 | Nirider | Nov. 8, 1927 |
| 1,724,379 | Storm | Aug. 13, 1929 |
| 1,945,125 | Swanson et al. | Jan. 30, 1934 |
| 2,290,126 | Flink | July 14, 1942 |
| 2,344,317 | MacDonald | Mar. 14, 1944 |
| 2,360,125 | Griffiths | Oct. 10, 1944 |
| 2,421,211 | Lutz | May 27, 1947 |

FOREIGN PATENTS

| Number | Country | Date |
| --- | --- | --- |
| 609,034 | Great Britain | Sept. 24, 1948 |